May 23, 1967  S. DOCK  3,321,254
BEARING
Filed Jan. 2, 1964
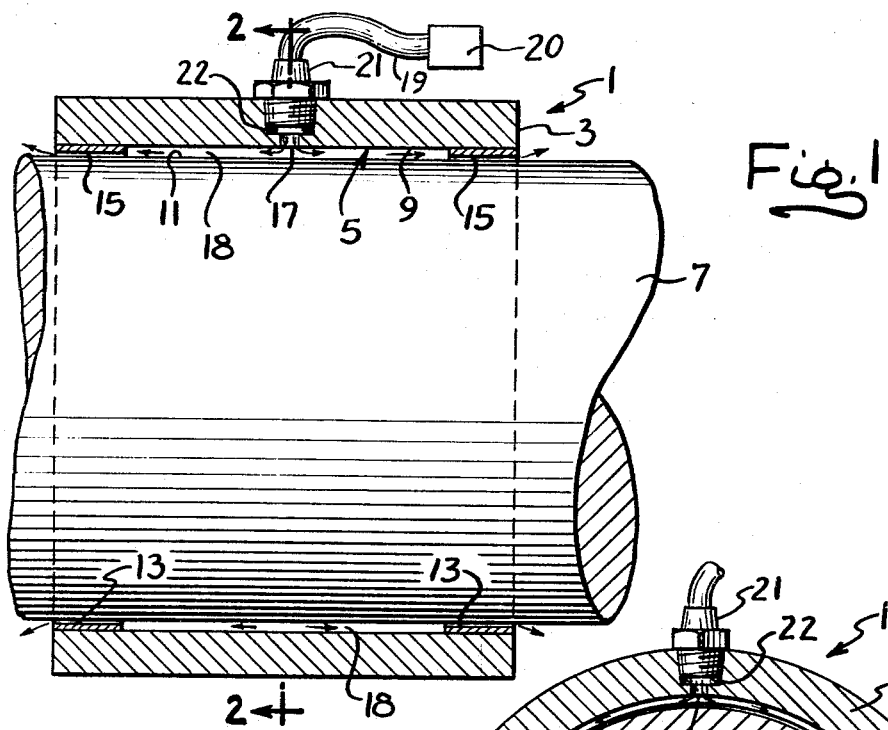
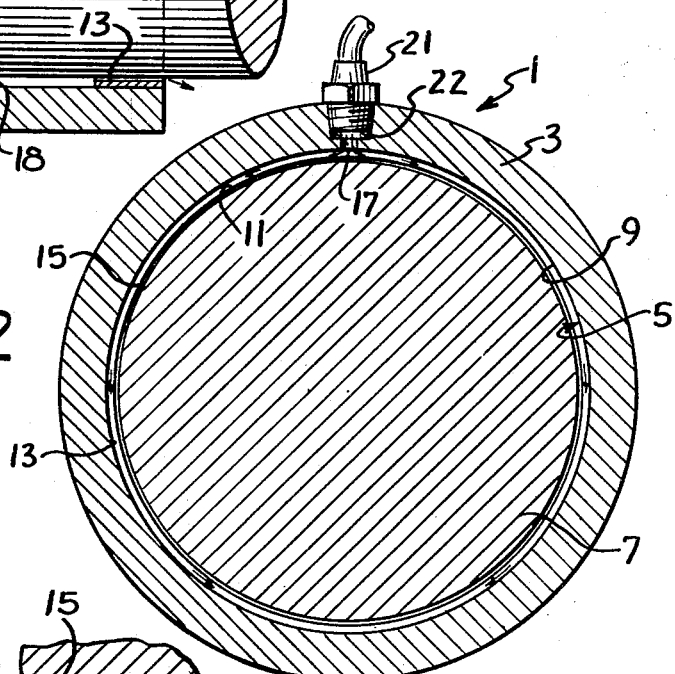
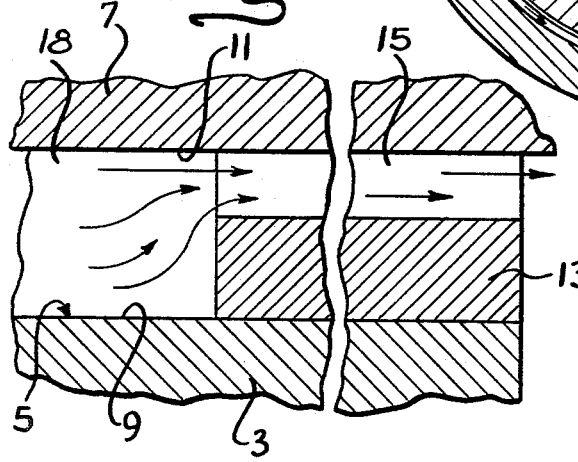
INVENTOR.
SYDNEY DOCK
BY Morris Spector
ATTY.

United States Patent Office 3,321,254
Patented May 23, 1967

3,321,254
BEARING
Sydney Dock, Niles, Ill. (9057 Emerson,
Des Plaines, Ill. 60018)
Filed Jan. 2, 1964, Ser. No. 335,164
12 Claims. (Cl. 308—9)

This invention relates to improvements in bearings in which the lubricating film between the bearing surfaces is a gas, usually compressed air, and is more commonly referred to as an air bearing.

In an air bearing, compressed air or other gas is forced between the bearing surfaces to provide a pressurized film-thickness of lubricant that inhibits or prevents physical contact of the bearing surfaces. Lubrication with a gas has the unique advantage in that the bearing friction is substantially reduced over that present in a similar bearing lubricated with a liquid, and the bearing can be made to function at extreme temperatures. In fact, the reduction in friction may be of the order of several thousand times. This low friction reduces the "drag" and thus permits a higher rate of speed for the rotating element of the bearing than would otherwise be possible if a liquid lubricant were used.

While the friction in a journal-type bearing may be reduced by the use of roller or ball bearings, precision alignment of the rotating parts may be sacrificed, in addition to the fact that the use of roller or ball bearings increases the over all cost of the bearing. On the other hand, journal-type air bearings have the advantage of providing very close tolerances between bearing surfaces and, at the same time, relatively low friction. This means that journal-type air bearings may be used where low friction and precision alignment is desired. For instance, where there is a spindle or shaft rotating in a bearing sleeve, precision alignment and low friction is desired where the spindle is used for holding a cutting tool that is to be precision ground.

In air bearing of the foregoing type it is desirable, of course, to utilize the maximum bearing surfaces for the particular length and bore of bearing sleeve and spindle used. The reason for this lies in the fact that the greater the area of the bearing surfaces, the greater will be the area of the supporting film of gaseous lubricant, and, therefore, the greater the load that can be carried by the spindle without metal-to-metal contact of the bearing surfaces.

It is an object of the present invention to provide a gas-lubricated journal bearing in which there are close filamentary tolerances between the bearing surfaces, and at the same time, the areas of the cooperating bearing surfaces are increased substantially over that heretofore used, thereby to increase the load carrying capacity of the bearing.

It is a further object of the present invention to provide a bearing of the type stated that includes a sleeve member in which there is a spindle member, one of the members being rotatable relative to the other. The bearing also includes means for introducing gas under pressure to the region between the bearing surfaces of the two members to provide a lubricating film therebetween. The shaft and sleeve cooperate to form axially spaced restrictions that retard at the escape of gas from between the bearing surfaces, and, furthermore, the bearing surfaces extend continuously from one restriction to the other so that substantially a maximum utilization of the bore of the sleeve as a bearing surface is achieved.

It is also an object of the present invention to provide a bearing of the type stated in which the shaft and the bore of the bearing sleeve are of substantially uniform diameter between the restrictions, and the restrictions are at the ends of the bearing sleeve.

It is an additional object of the present invention to provide a bearing of the type stated in which the restrictions are formed by diametrally reduced end portions of the bore of the sleeve, the end portions having lesser clearances with the shaft than the shaft has with the bearing surface of the sleeve. The diametrally reduced end portions of the sleeve may be formed by electroplating or otherwise depositing in the bore layers of a suitable material, such as tungsten carbide.

It is a still further object of this invention to provide a bearing of the type stated which is economical of construction.

The attainment of the above and further objects of the present invention will be apparent from the following specification taken in conjunction with the accompanying drawing forming a part thereof.

In the drawing:

FIGURE 1 is a sectional view through the longitudinal axis of a bearing assembly that is constructed in accordance with and embodies the present invention;

FIGURE 2 is a sectional view taken along line 2—2 of FIGURE 1; and

FIGURE 3 is an enlargement of a portion of FIGURE 1.

Referring now in more detail and by reference characters to the drawing, which illustrates a preferred embodiment of the present invention, 1 designates a bearing assembly that comprises a bearing sleeve 3 having a bore 5 in which a shaft or spindle 7 is rotatably mounted. The shaft 7 may extend outwardly from the opposite ends of the sleeve 3 and may also be axially shiftable within the sleeve bore 5. The bore 5 has a central cylindrical bearing surface 9 of uniform diameter that cooperates with the uniform diameter outer cylindrical or bearing surface 11 of the shaft 7.

At its opposite ends, the bore 5 has diametrally reduced cylindrical rings 13, 13. These rings 13, 13 are each of a length which is a small fractional part of the overall length of the bore 5. For example, a bearing sleeve bore may be about 1²³⁄₃₂ inches long and the rings 13, 13 may each be about ¼ inch long. The rings 13, 13 may be formed in any suitable manner. By way of example and not of limitation, the rings 13, 13 may be tungsten carbide or hard chromium electroplated or otherwise deposited onto the surface of the bore. Other hard materials, (for instance ceramics) may be used. These hard rings provide wearing surfaces that prevent wearing or damage to the surfaces 9, 11 if the gas supply to the bearing is accidentally not used or is shut off while the bearing is in operation.

In one form of the invention the shaft 7 may have an external diameter of the order of 1.7176 inches while the inner diameter of the rings 13, 13 may be of the order of 1.7180 inches. The rings 13, 13 may be of a radial thickness of the order of 0.0003 inch, that is their maximum diameter, as well as the diameter of the bearing surface 9, is of the order of 1.7186 inches. For clarity of illustration, these small dimensions have been greatly exaggerated on the drawing. The radial clearance between the shaft bearing surface 11 and the sleeve bearing surface 9 may be of the order of 0.0006 inch, preferably plus or minus 0.0002 inch, while the radial clearance between the surface 11 and rings 13, 13 should be less than that amount. It should be as small as possible to reduce the escape of gas, as hereinafter explained, while at the same time large enough to prevent binding of the shaft in the bearing. Here it is shown as of the order of 0.0002 inch. Therefore, the rings provide closely adjacent supporting surfaces surrounding the shaft and the cylindrical regions 15, 15 between the shaft and rings constitute restrictions, for purposes presently more fully appearing. It should be understood that by varying the radial clearances between the shaft and the rings 13, and by varying the radial clearance between the shaft and the wall of the bore 5 the load carrying characteristics of the bearing change, as does the loss of air through the bearing.

Since the load carrying characteristics of the bearing depend upon the areas of the bearing surfaces 9, 11, the sleeve 3 may be lengthened and the bore and shaft diameter reduced and still retain the load carrying characteristics of the bearing assembly. For applications where space is restricted, sleeves of lesser diameter but greater length may be fabricated with machinery used for forming rifle bores to obtain the same bearing surface area 9 as in the case of a shorter length sleeve with a larger diameter bore. However, where such long length sleeves are used, the length of the rings 13, 13 need not be increased. Thus for a sleeve having a length of about 7 inches and a bore diameter of about ¾ inch, the rings 13, 13 need only be about ¼ inch long, just as in the case of the 1²³⁄₃₂ inch long sleeve.

Formed in the sleeve three is a radial port 17 which provides a passageway to the space 18 between the bearing surfaces 9, 11. A gas supply line 19 is in communication with the port 16 through a fitting 21 whereby a continuous flow of gas may be delivered from a suitable source of gas 20 to the region 18 between the bearing surfaces 9, 11. An O-ring gasket 22 may be used to prevent leakage from around the fitting 21. The gas is delivered under sufficient pressure to "float" the shaft 7 in the sleeve 3. While air is customarily used, other gases, such as carbon dioxide or nitrogen may be used.

The continuous flow of gas between the bearing surfaces 9, 11 provides a thin supporting film of lubricant that reduces the friction between those two bearing surfaces to an exceedingly low value. In the present embodiment of the invention, a gas pressure of the order of 50 to 100 pounds per square inch gauge has been found to be satisfactory. The gas flows around the shaft 7 and completely fills the space 18 between the bearing surfaces 9, 11 and also flows in opposite directions axially of the bore 5, escaping from the bore through both restriction 15, 15, as indicated by the arrows in the drawing. However, the restriction retard the escape of gas from between the bearing surfaces and thereby permit a gas pressure to be maintained between the bearing surfaces sufficient to maintain a proper supporting film of lubricant.

The fact that the gas continuously flows between the bearing surfaces 9, 11 and then escapes through the restrictions assists in maintaining the cleanliness of the bearing surfaces. Small particles of foreign matter will be carried outwardly through the restrictions and the escaping gas will impede the entrance of dirt from the outside of the sleeve through the restrictions.

An important feature of the present invention lies in the fact that the bearing surfaces 9, 11 extend uninterruptedly from one restriction to the other, the bearing surface 9 having its area reduced only by the small amount taken up at the port 17. Consequently, substantially the maximum of each of the surfaces 9, 11 is effectively utilized as a bearing surface and the shaft 7 is, therefore, capable of properly supporting loads that might not otherwise be possible if lesser amounts of the surfaces 9, 11 were so utilized.

While reference has been made to the shaft 7 as rotating and sliding within the bore 5 of the sleeve 3, it is obvious that the sleeve 3 could rotate with respect to a shaft 7. In the latter event, the gas supply line could be connected to the shaft at a suitable port that is formed therein and which leads to the space between bearing surfaces 9, 11. Moreover, either the sleeve or the shaft could be axially shiftable, one relative to the other, without either being rotatable relative to the other.

In compliance with the requirements of the patent statutes, I have herein shown and described a preferred embodiment of the invention. It is, however, to be understood that the invention is not limited to the precise constructions herein shown, the same being merely illustrative of the principles of the invention. What is considered new and sought to be secured by Letters Patent is:

1. In combination, a bearing sleeve member, a shaft member in said sleeve, one of the members being movable relative to the other, the shaft and sleeve having sufficiently small clearance between them to provide cooperating supporting bearing surfaces, one of said members having port means at its bearing surface for delivering gas under pressure to the region between the bearing surfaces to provide thereat a supporting film of gaseous lubricant, and cooperating means on the shaft and sleeve that form restrictions at the axially opposite ends of the supporting bearing surfaces to retard the escape of gas from between the bearing surfaces, said cooperating means including rings of material deposited on one of said surfaces that prevent surface-to-surface contact of the bearing surfaces in the absence of gas under pressure therebetween, said cooperating supporting bearing surfaces extending axially and circumferentially uninterruptedly from one restriction to the other except for the port means, the area occupied by said port means being small as compared to the total areas of the bearing surface so as to utilize substantially all of said surfaces for bearing support.

2. In combination, a bearing sleeve member, a shaft member in said sleeve, one of the members being rotatable relative to the other, the shaft and sleeve having sufficiently small clearance between them to provide cooperating cylindrical bearing surfaces, one of said members having port means at its bearing surface for delivering gas under pressure to the region between the bearing surfaces to provide thereat a supporting film of gaseous lubricant, and cooperating means on the sleeve and shaft that form restrictions at axially opposite ends of the supporting bearing surfaces to retard the escape of gas from between said bearing surfaces, said cooperating bearing surfaces axially and circumferentially throughout 360 degrees extending uninterruptedly from one restriction to the other except for the port means, the area occupied by said port means being small as compared to the total areas of the bearing surface so as to utilize substantially all of said surfaces for bearing support.

3. In combination, a bearing sleeve member, a shaft member in said sleeve, one of the members being rotatable relative to the other, the shaft and sleeve having cooperating bearing surfaces, one of said members having port means at its bearing surface for delivering gas under pressure to the region between the bearing surfaces to provide thereat a supporting film of gaseous lubricant, and diametrally reduced means on the sleeve and cooperating with the shaft to form restrictions at axially opposite ends of the bearing surfaces, said cooperating bearing surfaces axially extending uninterruptedly from one restriction to the other except for the port means, the area occupied by said port means being small as compared to the total areas of the bearing surface so as to utilize substantially all of said surfaces for bearing support, the diametrally reduced means being deposits of material at the opposite ends of the sleeve.

4. The combination according to the claim 1 wherein the cooperating bearing surfaces are each of constant diameter between the restrictions and the difference in diameter is of the order of 0.001 inch.

5. The combination of claim 4 in which the restrictions are at the ends of the sleeve.

6. In combination, a bearing sleeve having a cylindrical bore, a shaft rotatable and axially slidable in said bore with the shaft and wall of the bore being sufficiently close to form cooperating bearing surfaces, said sleeve having radial port means opening at one of said bearing surfaces for delivering gas under pressure to the region between the bearing surfaces to provide a supporting film of gaseous lubricant, and means forming wearing surfaces of hardened material at the opposite ends of the bore and forming cylindrical openings having diameters less than that of the bore, the shaft projecting through said openings and cooperating with said bearing surfaces to form cylindrical restrictions that retard the escape of gas from between the bearing surfaces.

7. The combination according to claim 1 wherein the rings of material comprise tungsten carbide.

8. The combination according to claim 1 wherein the rings of material comprise chromium.

9. The combination according to claim 1 wherein the rings of material comprise ceramic material.

10. The combination according to claim 6 wherein the cooperating bearing surfaces have substantially uniform diameters which differ in the order of 0.001 inch.

11. In combination, a bearing sleeve member having a cylindrical bore, said cylindrical bore having a central portion that terminates at its opposite ends in end portions that are adjacent to the opposite ends of the sleeve, the end portions being of a combined length that is a minor fractional part of the length of the central portion, said central portion having a substantially uniform diameter and the end portions each having a substantially uniform diameter that is less than that of the central portion, and a shaft member in said bore and projecting outwardly from the opposite ends thereof, one of said members being movable relative to the other, said shaft member being of such uniform diameter throughout the full part thereof that is between the end portions that said full part and said central portion form cooperating closely fitting bearing surfaces, the end portions and outer cylindrical surface of the shaft forming circumferential restrictions, said sleeve having a gas inlet port that terminates at one of said bearing surfaces, the area of said gas inlet port being small as compared to the areas of the bearing surface, means for supplying a continuous flow of gas under pressure to said gas inlet port so that a continuous flow of gas under pressure may be admitted between said bearing surfaces and provide thereat a supporting film of gaseous lubricant with the escape of the flowing gas from between the bearing surfaces being retarded by said restrictions.

12. The combination according to claim 11 wherein the radical clearance between the end portions and outer cylindrical surface of the shaft is of the order of 0.0002 inch and the radical clearance between the bearing surfaces is of the order of 0.0006 inch.

References Cited by the Examiner
UNITED STATES PATENTS

| | | |
|---|---|---|
| 2,179,824 | 11/1939 | Kip. |
| 2,898,764 | 8/1959 | Kinsey et al. |
| 3,008,776 | 11/1961 | Love et al. _____ 308—121 |
| 3,112,140 | 11/1963 | Adams. |
| 3,140,853 | 7/1964 | Lindner. |
| 3,186,778 | 6/1965 | Torii _____ 308—121 |

FOREIGN PATENTS

| | | |
|---|---|---|
| 480,332 | 2/1938 | Great Britain. |

MARTIN P. SCHWADRON, *Primary Examiner.*

FRANK SUSKO, DAVID J. WILLIAMOWSKY,
*Examiners.*

UNITED STATES PATENT OFFICE
CERTIFICATE OF CORRECTION

Patent No. 3,321,254                          May 23, 1967

Sydney Dock

It is hereby certified that error appears in the above numbered patent requiring correction and that the said Letters Patent should read as corrected below.

Column 5, line 2, for "bearing" read -- wearing --.

Signed and sealed this 14th day of November 1967.

(SEAL)
Attest:

Edward M. Fletcher, Jr.

Attesting Officer

EDWARD J. BRENNER

Commissioner of Patents